(12) United States Patent
Kianpour et al.

(10) Patent No.: US 9,612,933 B2
(45) Date of Patent: Apr. 4, 2017

(54) METHOD FOR DETERMINISTIC STRESS BASED RISK REDUCTION

(71) Applicants: Payman Kianpour, Vaughan (CA); Graham Wadeson, Vaughan (CA)

(72) Inventors: Payman Kianpour, Vaughan (CA); Graham Wadeson, Vaughan (CA)

(*) Notice: Subject to any disclaimer, the term of this patent is extended or adjusted under 35 U.S.C. 154(b) by 796 days.

(21) Appl. No.: 14/029,669

(22) Filed: Sep. 17, 2013

(65) Prior Publication Data

US 2014/0081583 A1 Mar. 20, 2014

Related U.S. Application Data

(60) Provisional application No. 61/702,491, filed on Sep. 18, 2012.

(51) Int. Cl.
| | |
|---|---|
| *G06F 17/50* | (2006.01) |
| *G06F 7/60* | (2006.01) |
| *G06F 17/10* | (2006.01) |
| *G06F 11/34* | (2006.01) |
| *G06F 11/00* | (2006.01) |
| *G06F 11/24* | (2006.01) |

(52) U.S. Cl.
CPC ........ *G06F 11/3409* (2013.01); *G06F 11/008* (2013.01); *G06F 11/24* (2013.01)

(58) Field of Classification Search
CPC ..... G06F 11/3409; G06F 11/24; G06F 11/008
USPC ...................................................... 703/2, 10
See application file for complete search history.

(56) References Cited

U.S. PATENT DOCUMENTS

| | | | |
|---|---|---|---|
| 5,586,252 A | 12/1996 | Barnard et al. | |
| 7,035,769 B2 | 4/2006 | Cutuli et al. | |
| 7,937,679 B2 | 5/2011 | Mariani | |
| 2004/0182573 A1* | 9/2004 | Gunawardana | .... G01R 31/2858 166/250.01 |
| 2005/0197813 A1* | 9/2005 | Grayson | ................. E21B 47/00 703/10 |
| 2008/0015827 A1* | 1/2008 | Tryon | .................... G06F 11/008 703/2 |
| 2009/0055135 A1* | 2/2009 | Tang | ....................... E21B 10/00 703/1 |
| 2012/0084065 A1* | 4/2012 | Zhan | .................... G06F 17/5009 703/13 |
| 2012/0254044 A1 | 10/2012 | Flanagan et al. | |

* cited by examiner

*Primary Examiner* — Dwin M Craig
(74) *Attorney, Agent, or Firm* — Nasser Ashgriz; VIPatent Inc.

(57) ABSTRACT

A deterministic risk reduction method for product reliability comprising the steps of: receiving a plurality of parameters associated with at least one of a goal concept, desired functionality and performance criteria for said product; performing an analysis of said product, said analysis comprising levels of cause and effect for identifying and quantifying key performance factors and failure mechanisms associated with said product; developing test protocols and subjecting said product to stress tests corresponding to said test protocols to determine at least one operating limit for said product, whereby a relationship between said stress and expected life of said product is provided; and estimating said product life based on said key performance factors and said stress tests.

7 Claims, 5 Drawing Sheets

PBDC = Performance Based Design Characteristic
LBDC = Load Based Design Characteristic
OSF = Operating Stress Factor
KPF = Key Performance Factor

PBDC = Performance Based Design Characteristic
LBDC = Load Based Design Characteristic
OSF = Operating Stress Factor
KPF = Key Performance Factor

METHOD FOR DETERMINISTIC STRESS BASED RISK REDUCTION

RELATED APPLICATION

This application claims the benefit of U.S. Provisional Application No. 61/702,491 filed Sep. 18, 2012.

FIELD OF THE INVENTION

The present invention relates to a reliability analysis and testing process.

BACKGROUND OF THE INVENTION

The design and development of new engineered-products is a costly and challenging activity that is subjected to a high level of technical uncertainty. The uncertainties in product reliabilities are mitigated by dividing a complex product into carefully selected control volumes for which the interface parameters can be well defined. In doing so, however, designers can lose sight of the application-level, operating stresses, and their effect upon the control volume's intended performance and stresses.

Product reliability is an important aspect of any product development. Reliability is the probability that a material, component, or system will perform its intended function under defined operating conditions for a specific period of time. The conventional product development approach to reliability focuses on the following three main steps:

Failure Mode and Effect Analysis (FMEA);
Failure avoidance methods operating in parallel with product development; and
Reliability testing with large samples to obtain statistical confidence.

Statistical methods rely on statistical models to predict reliability. However, in order for these models to be valid a significant sample size is required. This reliance on sample size places a major economic burden on qualification of industrial systems. As a result, most companies, not able or willing to pay for the complete test, simply deviate from the correct sample size while still using the statistical method. Instead of testing with the required sample sizes, companies design tests to fail with fewer samples and stop the test upon a few failures. This requires more complex statistical mathematics and greater costs associated with any form of population testing. In addition, statistical methods typically do not use trending information and normally work with sudden failures.

Furthermore, trends in performance and stress are often unclear, their real proximity to a defined failure stress is unknown and key stresses are not identified as such. Consequently, unexpected failures can occur during testing or after launching field applications, resulting in very high direct recall costs and brand devaluation.

In the 1960's Design Failure Mode and Effects Analysis (DFMEA) was conceived to reduce the frequency of unexpected failure. In this process a diverse group of experienced people (e.g. design engineers, service technicians and users) attempt to identify all of the potential failure modes, their probability of occurrence and potential consequences.

However, the DFMEA method is inherently flawed in that (a) the number of potential failure modes in a specific control volume can be extremely large, thus increasing the likelihood that some will be missed, and (b) the results from DFMEA do not provide the information needed by the designer to correct those failures that are identified.

The conventional approach starts with failure modes (i.e. FMEA, etc.) and assesses the risks based on experience. The present invention identifies the stresses in the product, identifies related failure mechanisms and their associated failure modes and generates engineering knowledge. The challenge in the conventional approach is that there are an infinite number of failure modes, but only a finite number of stresses. Focusing on failure modes expands development resources without significantly reducing product launch risks.

The present invention changes the focus of the product development process to generate objective engineering milestones that start with functions and lead to the failure mode. The present invention utilizes an integrated approach, using a strong engineering/scientific foundation to find a failure mechanisms based on design intent. Every step in the process provides another part of the puzzle to fully understand product life expectancy. Unlike failure modes, the present invention is focused on a specific part of the whole system, referred to as a control volume, where the number of stresses are often quite few. As such, the system can be readily analysed. The results of such analysis provide precisely the data required by the designer to correct his/her design for the whole system. Thus the present stress-based approach is much preferred over the previous conventional methods.

SUMMARY OF THE INVENTION

The present invention is a deterministic risk reduction method known as Intelligent Reliability Technology (IRT). It is an engineering risk reduction methodology that provides tools to engineering teams for solving complex problems and accelerating new product realization. It is fully integrated with the entire product development cycle; from ideation to product launch.

This method starts by applying a control volume on a system to be analyzed. Multi-stress/failure mechanism interaction techniques are applied on the control volume to reveal product weaknesses, replicate problems and generate multiple options to resolve them. This process is repeated on all system control volumes. Information from small sample sizes are gathered to model the whole system.

The present deterministic risk reduction method for a product reliability comprises of the following steps: First the desired functionality and the product performance are determined. The intended function of the product and its operating conditions are identified. Then the parameters that determine such functionality and performance are identified. Next the product is analyzed to identify and quantify the key performance factors and failure criteria associated with said product. Next, a test protocol is developed and the product is subjected to stress tests corresponding to said test protocol to determine at least one operating limit for said product, whereby a relationship between said stress and expected life of said product is provided. Finally, the product life is estimated based on said key performance factors and said stress tests. Life data, time to failure data, and other failure data are obtained.

In order to provide a general methodology for deterministic risk reduction in product reliability, the present method and technology is provided in several modules. A design intent module to receive a plurality of parameters associated with at least one of a goal concept, desired functionality and performance criteria for said product; a design sensitivity module to perform an analysis of said product, for identifying and quantifying key performance factors associated with the design parameters of the said product; a design limit module to subject said product to stress tests corresponding to test protocols to determine at least one operating limit for said product, whereby a relationship between said stress and expected life of said product is provided; and a design life model to estimate said product life based on said key performance factors and said stress tests.

Advantageously, the reliability method is self auditing and comprises a series of quality check points. The method can be applied to a wide range of components and subsystems in various industries, such as, mechanical, electrical and fluid power components and subsystems. More importantly, the reliability method of the present invention focuses on variable reduction, rather than population testing.

The present Intelligent Reliability Technology (IRT) embeds reliability into the engineering design process, at no additional cost, and predicts the reliability of each component during the early stages of development and prototyping while using only small sample sizes. For instance, it provides accurate and repeatable tools to the fast paced automotive industry to compare emerging technologies, qualify alternative suppliers, materials and manufacturing processes.

Other advantages over the prior art methods include reduced time to market, reduced costs, minimal long-standing field issues, faster qualification of design changes and shorter test times. Other objects, advantages and novel features of the present invention will become readily apparent from the following drawings and detailed description of preferred embodiments.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various FIGs contained herein are intended to represent exemplary functional relationships and/or physical couplings between the various elements. It should be noted that many alternative or additional functional relationships or physical connections may be present in a practical system.

Figure 1:
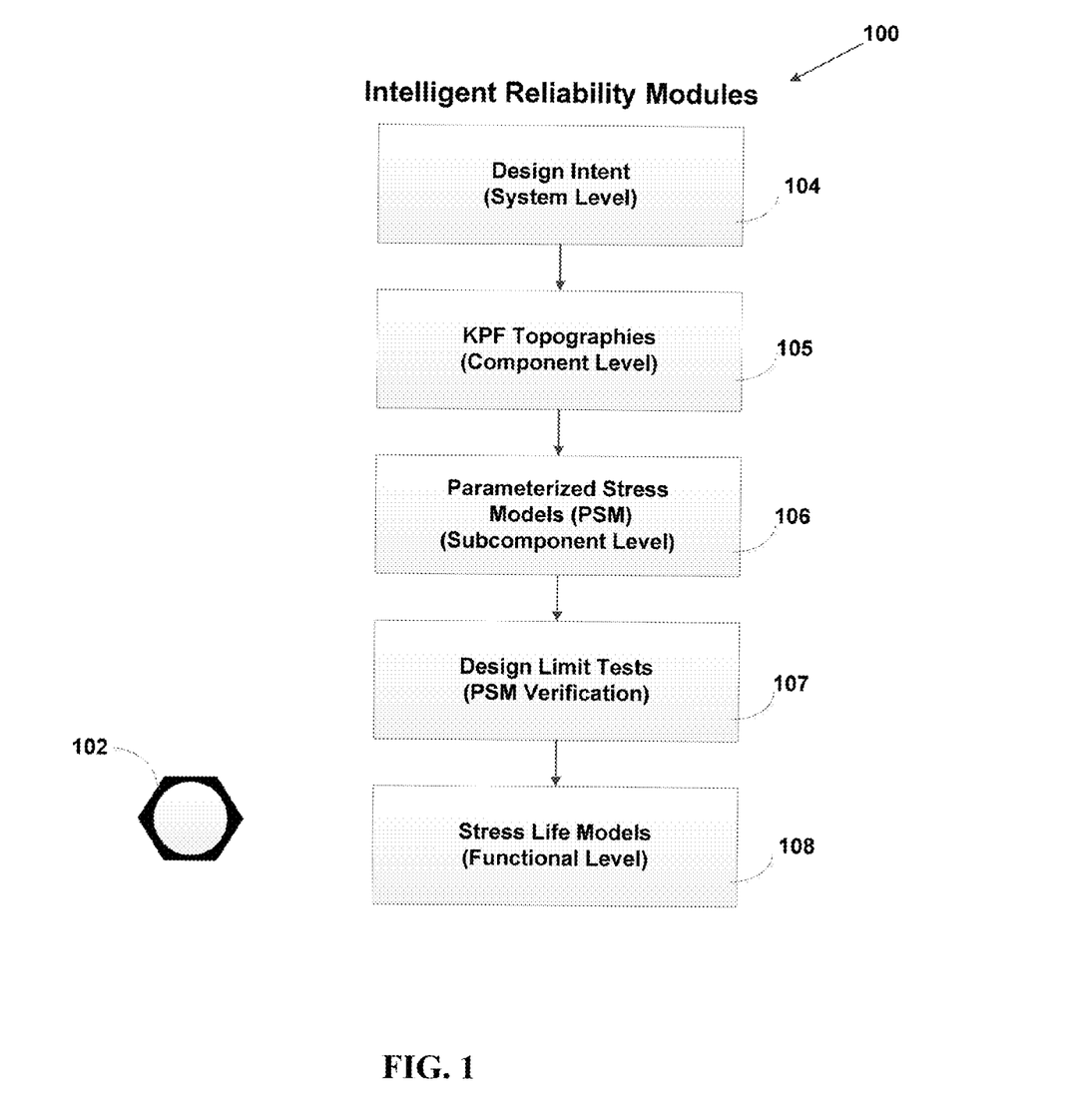
FIG. 1 shows a high-level component architecture of present Deterministic Stress Based Risk Reduction method.

FIG. 1 shows a high-level component architecture of present Deterministic Stress Based Risk Reduction (DS-BRR) 100 for performing a deterministic risk reduction method for product reliability. As an example, system 100 may be employed in product development and design optimization, including rapid prototyping and root cause analysis to determine failure conditions of product 102. Generally, the system 100 performs reliability analysis and testing of a product 102 to predict the service life of the product 102 or the product life. The system 100 comprises of a design intent module 104, KPF topographies 105, parameterized stress models (PSM) 106, design limit tests 107, and stress life models 108. This method operates both manually and on a computer system.

Design Intent (DI) 104 and Design Intent Profiles (DIPs) represent the functional requirements (with control volume, measurable Key Performance Factors, Interface, Reliability and Packaging) and stress cycles that are driven from the interaction of the system state and the component state which it controls. As an example, DI and DIP can be written as follows:

$$DI = f(\text{Control volume, KPF, Interface})$$

$$DIP = f(\text{System state, Component state})$$

In other words, design intent, DI, is determined based on key performance factors and system interfaces considered for any control volume or subsystem in the system. Similarly, design intent profile, DIP, is determined based on system and component states. Key performance factor 105 acts by itself as a subjective term. The present invention defines the KPF (Key Performance Factor) as the main set of functions that the component is designed for. KPF can be written as follows:

$$KPF = f(\text{design parameters, interface})$$

For instance, a design parameter can be, inter alia, a dimension, a material property or the required internal loading inside a control volume.

Figure 2:
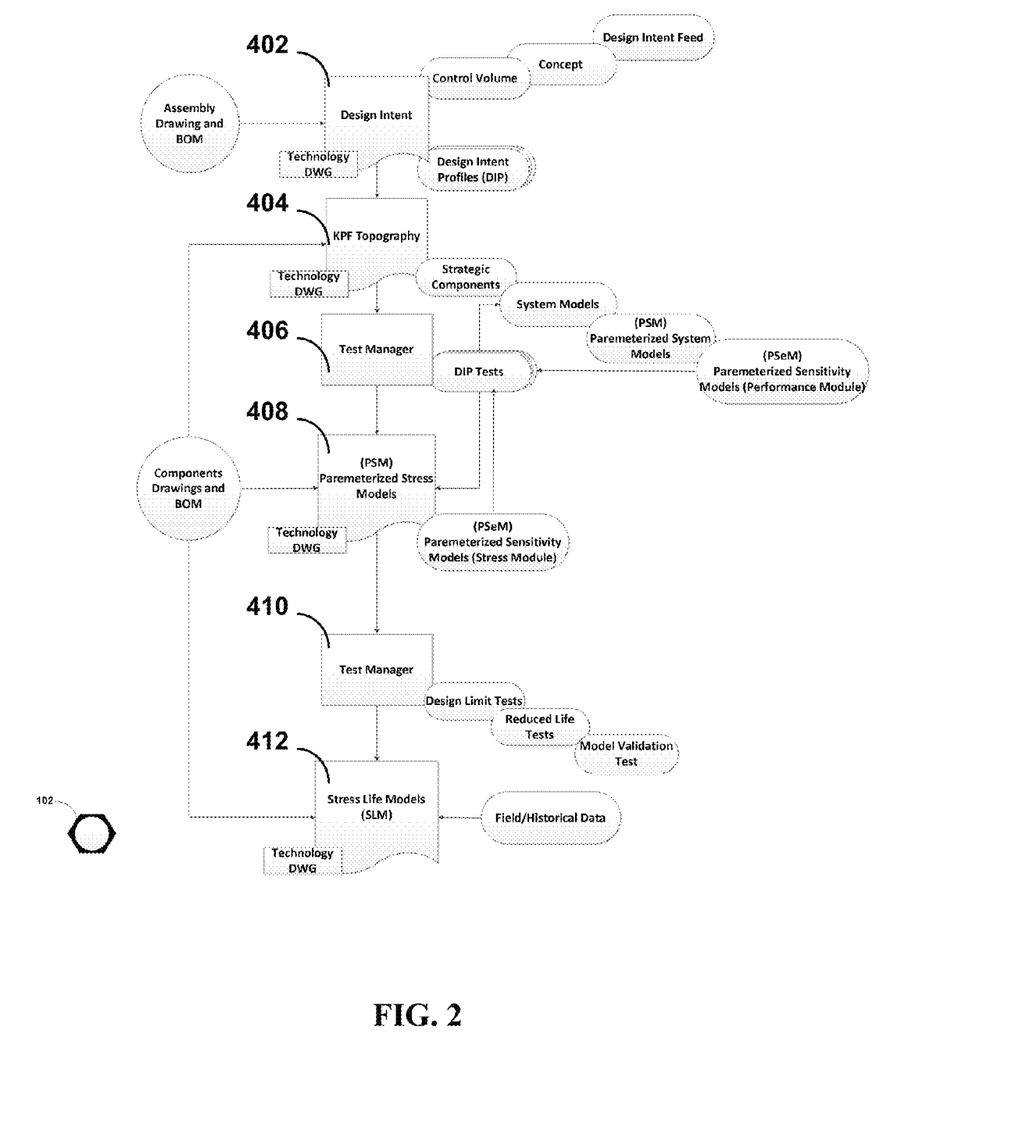
FIG. 2 shows a more detailed schematic diagram of an exemplary system for a deterministic risk reduction method for product reliability.

FIG. 2 shows a more detailed flow diagram showing exemplary steps for performing a deterministic risk reduction method for product reliability, generally identified by reference numeral 100.

Referring to FIG. 2, in step 402, the design intent for the product 102 is defined by specifying a plurality of parameters for a control volume, including the functionality and functionality interface, power, structural integrity, life expectancy, and product duty cycle. A design intent profile (DIP) is generated based on the aforementioned parameters, and general engineering models that support the functionalities. Design Intent 402 is generated by developing the system state and how it controls the component state leading to the definition of a component's main functionality, Key Performance Factors (KPF) and interface. Design intent 402 is a unique technique to capture and highlight the Control Volume, KPFs, Interface, Power, Structural Integrity, Packaging and Reliability. Design Intent Profile (DIP) is generated by the interaction between the system state and component state. It defines the state of operation of the control volume. The novelty of the DIP is in visualization of the Design Intent 402 for products with a large spectrum of duty cycles. DIP tests the product at various operating points to establish the home position for stress and performance under normal operating conditions.

Next, a key performance factor (KPF) topography is determined, step 404. The KPF topography outlines the strategic components of the product 102 that support the desired performance objectives, and identifies the loads to those components, including the design parameters. Design intent profile test protocols are developed to verify the design intent objectives followed by a step of performing engineering tests (ET) based on said design intent profile (DIP) test protocols. Details pertaining to the engineering tests and DIP tests, such as test protocols, test setup, test types, test definitions, test personnel, and test results, are managed by a test manager (step 406). Generally, home position stress and performance levels for input to the generalized engineering models are established by testing the design intent profiles.

Key Performance Factor (KPF) Topographies 404 are generated by modeling the response of the system to loading (internal forces) leading to system models for performance and stress. It is a comprehensive map of the strategic components and their loading elements involved in generating the KPF, parameterized system and sensitivity models. KPF Topography 404 creates a link between performance and loading mechanisms leading to stress. KPF Topography 404 is a KPF optimizer, while establishing the stresses at the operating point (home position). KPF Topography 404 creates a smooth transition from performance optimization to reliability measures. This method is extensively used by the automotive sector to compare competitive technologies and select the viable design for proceeding with Life analysis. The KPF topography 404 performs a systematic engineering analysis (EA) of the product 102. The analysis identifies the mechanisms supporting key performance factors (KPF) and quantifies the effect of changes in the design parameters of strategic components within the control volume.

The outcome of the tests is employed in the preparation of system models, parameterized system models (PSM), and parameterized sensitivity models (PSeM), in step 408. Generally, a key stress factor (KSF) is a function of at least one design parameter, operating stress; and a constant interface, and varying at least one design parameter results in a parameterized sensitivity model, while varying the operating stress results in a parameterized system model.

Parameterized Stress Models (PSM) 408 are generated by modeling a single stress and all of its operating stress factors to find the gap between the service life and end of life stress levels (for instance, shear stress between the a seal and rotor and its operating factors such as temperature, seal preload and rotational speed in rotors). End of Life is where a product reaches the failure point by applying the cumulative stress. Operating stress factors are interface parameters producing a particular stress.

In step 410, design limit test protocols, reduced life test protocols and model validation test protocols are defined and the corresponding tests are performed to verify the reliability objectives. Next, a stress life model is developed from the results of engineering tests (product performance) and design limit tests, or reduced life tests, or model validation tests (step 412).

Design Limit Tests (DLT) 410 are a form of cumulative step stress testing to define the interactions between a single stress and its failure mechanisms. DLT 410 validates each Parameterized Stress Model (PSM) 408, or generates an experimental PSM. It is also called single stress reliability evaluation. DLT 410 also filters the Key Stress Factors (KSFs) from the other stresses within the component. PSMs 408 together with the DLTs 410 provide innovative filters to realize the KSFs affecting life and cost. PSMs 408 can lead engineering teams to significant cost reductions.

Design limit tests 410 are defined to verify the reliability objectives, and may include building any requisite test stands, instrumentation and data acquisition systems. Generally, design limit tests (DLT) 410 are developed isolate a single stress using step-stress, cumulative damage techniques supported by analytical methods to reach the operating limit of the product 102 without the accumulation of time or a multiplicity of stress cycles. Throughout this process the relationship between the stress applied to the product 102 and expected service life is developed and characterizes a stress life model (SLM) 412.

Stress Life Models (SLM) 412 are a form of high stress low cycle testing to define the compound failure mechanisms caused by multiple stress interactions leading to defining field failure modes. SLMs 412 are generated using a series of unique techniques that start with the end of life stress, a series of reduced life tests and finally a model validation test.

The stress-life model 412 defines the acceleration factors over and above the duty cycle, and these factors determine the duration of an accelerated life test and correlates stress with the product 102 life. The development of the stress-life model starts from normal operating conditions defined by the engineering tests and continues to the maximum design condition, verified by the design limit tests. A gap is created between the elevated stress state chosen for the accelerated life test and the limiting stress levels revealed during design limit tests. Accordingly, the stress-life model predicts the expected time to failure for a product 102, while accelerated life testing provides confirmation of this prediction with a high sensitivity to error.

The methods for generating stress-life models 412 depends on key factors, such as, targeted life expectancy of the product 102 at the set operating condition (duty cycle), failure criteria defining the product design limit as a percentage of performance loss and the failure mechanism. Generally, physical stress, chemical reaction and wear are responsible for the majority of failures occurring during life testing. Quantification of the failure criteria is typically set by the allowable performance degradation of the product 102 and loss of performance expected at the end of life. Depending upon the nature of the failure mechanism (e.g. fatigue cracking) deterioration may not be apparent in the performance and specific failure monitoring methods may need to be included in the accelerated life test protocol. The mechanisms affected by the duty cycle and the expected failure modes provide a basis for the step-stress test design. The effect of stress at each step is evaluated by the cumulative damage observed.

Figure 3:
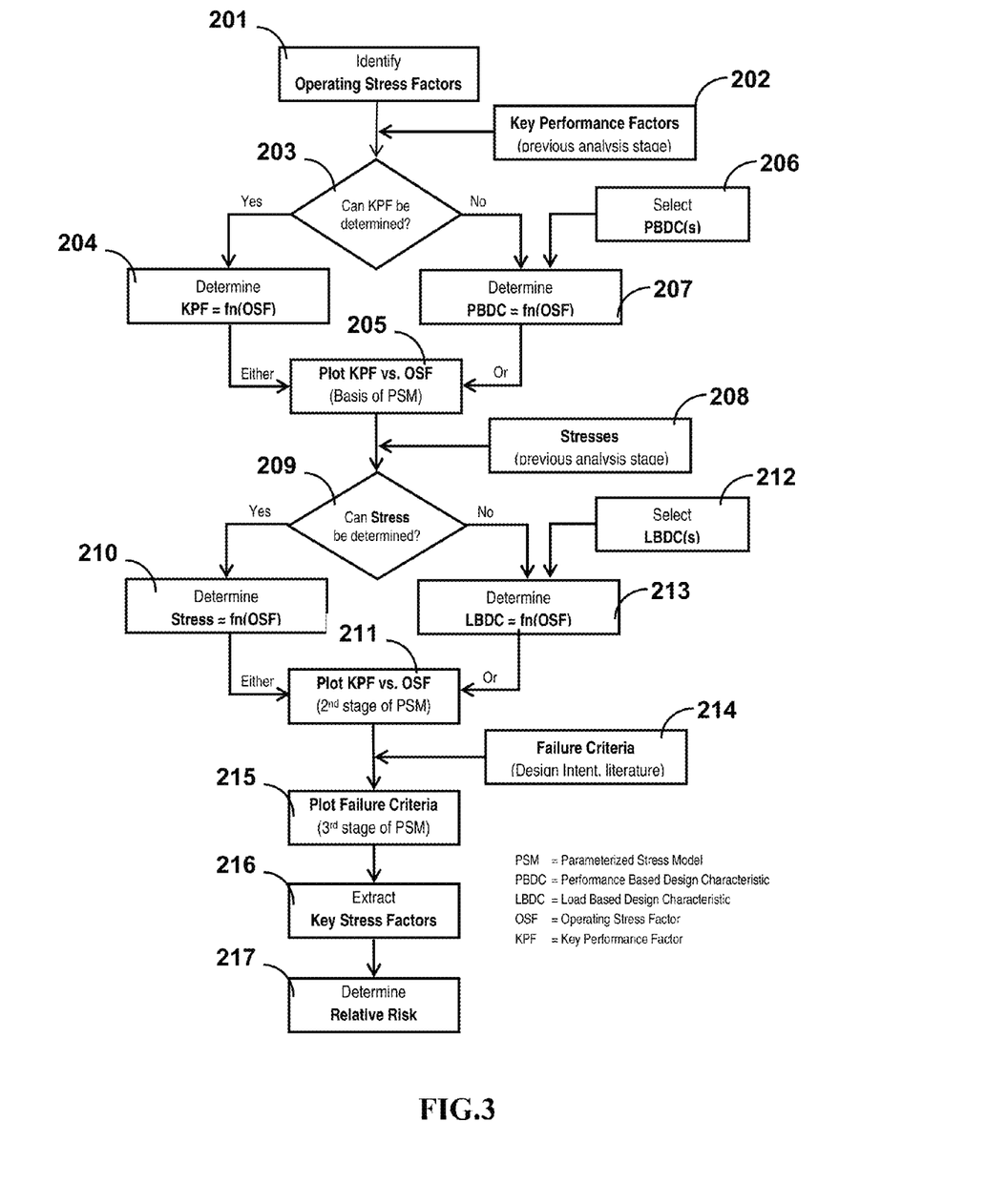
FIG. 3 shows a flow diagram showing exemplary steps in the preparation of the Parameterized Stress Model in accordance with the present invention.

FIG. 3 shows a flow diagram for preparation of the PSM, identifying the pre-requisites for each stage together with the input data requirements. Based on previous analysis the operating stress factors 201 are identified. These are the variable interface conditions, causing stress, that act upon the control volume in the application. In any application, the variable operating stress factors that have an effect upon the component stresses are generally few in number, independent of complexity. For example, despite its high degree of complexity, the operating stress factors for an internal combustion engine would be command of the engine speed (rpm), load on the output shaft and the ambient conditions (i.e. temperature, air density, humidity), all other factors being design characteristics resulting from the engine design parameters (e.g. compression ratio, fuel injection rate, engine component dimensions and clearances, etc.) Consequently, PSMs would be plotted for all each of the operating stress factors and each of the stresses to which the control volume is exposed.

The Key Performance Factors (KPFs) 202 are plotted on the same graph, where possible, against each Operating Stress Factor 201. This allows all of the KPFs to be monitored at the same time as the Operating Stress Factor is varied. KPFs are identified during Design Intent definition in a previous stage of analysis. In previous tests the ability of the control volume to achieve the KPFs within normal operating range will have been determined and if not met, would have resulted in changes in the design parameters. In order to plot the KPFs it is necessary to measure them or to calculate them from theory. The decision box 203 asks if this is possible. If the KPF can be measured or calculated then data showing the change in KPF in response to changes in each Operating Stress Factor, is determined 204 and plotted on the PSM 205.

Where a KPF cannot be quantified it is necessary to decide upon suitable Performance Based Design Characteristics (PBDCs) that can take their place 206. PBDCs may comprise one or more design characteristics and must be carefully chosen to react appropriately in response to the load. For example, when a low coefficient of friction, indicating the presence of an oil film between sliding parts, is the KPF, it might be substituted by the contact electrical resistance. Like the friction coefficient, the resistance will change suddenly when the oil film breaks down. Thus electrical resistance would appear to be a good proxy for the friction coefficient in the control volume under study.

Data showing the change in the PBDC relative to variations in each Operating Stress Factor 207 is obtained from theory or from testing and plotted 205 on the PSM in place of the KPF. Similarly the Stresses 208, determined during previous System Model analysis, are reviewed. The decision box 209 asks if they can be determined. If a Stress can be calculated or measured, then data showing the change in Stress resulting from changes in the Operating Stress Factor is generated 210 and plotted on the PSM 211.

Where it is not possible to determine the Stress then it may be substituted by one or more Load Based Design Characteristics (LBDCs). As with PBDCs, LBDCs must behave appropriately in response to the load. At this point each PSM will contain plots of all of the KPFs (or the PBDCs) against the Operating Stress Factors and at least one Stress (or LBDC). Superimposed onto this the Failure Criteria for the KPFs (or PBDCs) identified in the Design Intent and the Stress or LBDCs, are plotted 215. Key Stress Factors are identified 216 from the PSMs and the risk of the design is determined 217. A high risk design is one in which the number of KSFs is significant in proportion to the total number of Stresses to which a control volume is exposed.

Figure 4:
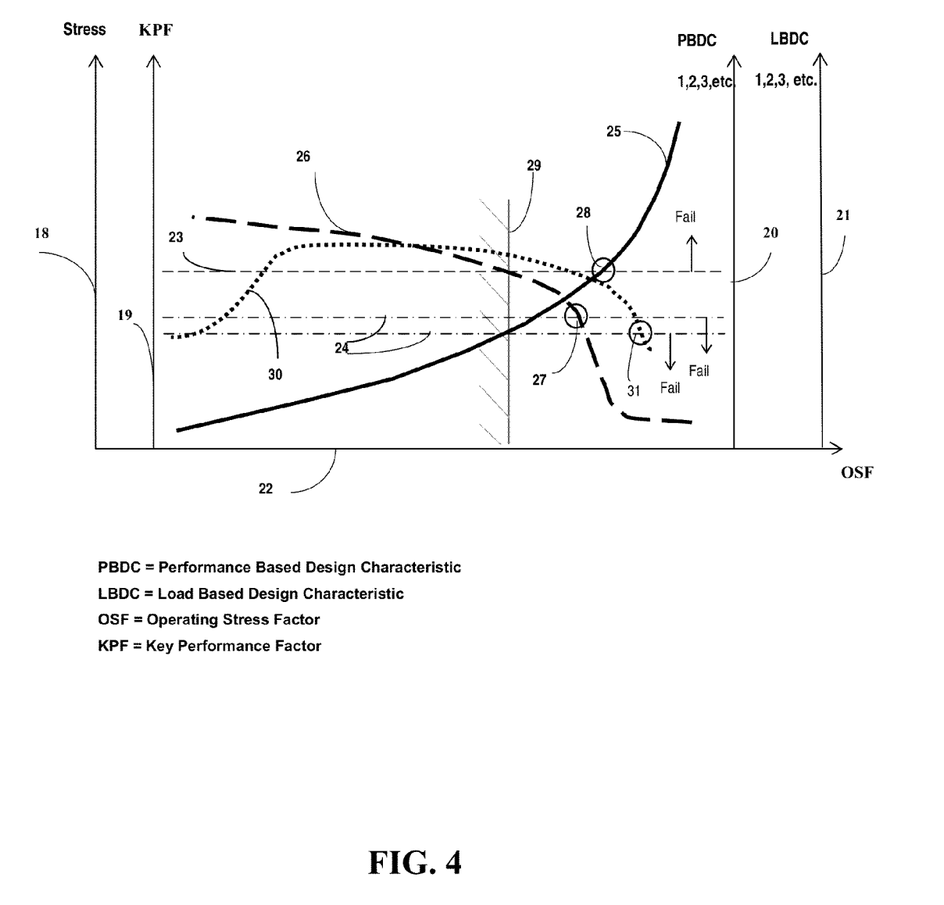
FIG. 4 shows a Parameterized Stress Model with relative locations of the End of Life, the Performance Limit and a characteristic application operating range.

FIG. 4 shows an exemplary PSM identifying all of the steps described above. The graph shows four Y-axes—Stress 18, Key Performance Factor 19, Performance Based Design Characteristic 20 and Load Based Design Characteristic 21—and a single X-axis for the Operating Stress Factor 22. In this example a single curve representing the Stress (or LBDC) 25 is plotted as a function of the Operating Stress Factor. This is the Parameterized Stress Model (PSM). Typically only a single Stress or LBDC curve would be plotted on each PSM. Conversely, several KPFs (or PBDCs) may be shown on the graph (e.g. 26 and 30 in the example) such that the link between the Stress and all of the affected KPFs may be seen.

The criteria for failure of both the Stress or LBDC 23 and the KPF or PBDC 24, as defined by the design engineer, are plotted on the graph. These criteria are not necessarily linear, as shown, but may be a range or area, depending upon the variable in question.

The point(s) at which the Stress (or LBDC) 28 and the KPF (or PBDC) (27 and 31) meet their respective failure criteria are defined as the End of Life for the control volume. This may or may not cause physical failure or damage to the control volume or its component parts, depending upon how failure is defined. In the example, one of the KPFs is seen to meet its failure criteria 27 at a lower Operating Stress Factor than either the Stress 28 or the other KPF 31. As the first curve to meet its failure criteria, the related Operating Stress Factor would be defined as the End of Life for the control volume. If the Stress line had met its failure criteria first, then this Operating Stress factor would have constituted End of Life.

The proximity of the End of Life to the normal maximum Operating Stress Factor 29 for the control volume would determine if the Stress is to be categorized, at the discretion of the designer, as a Key Stress Factor for further analysis.

It is not essential to achieve failure either theoretically or in testing in order to complete the PSM. In instances where the maximum normal Operating Stress Factor has been greatly exceeded, without meeting the failure criteria for the Stress, the KPF or their proxies, the Stress under consideration may be deemed not to be a Key Stress Factor and the analysis or test halted without failure.

Several test methods may be employed to create stress life models 108. One such method is a single stress test to failure method. This method is typically directed towards components comprising brittle material, such as sensors with ceramic sensing elements, which exhibit sudden onset of failure rather than a gradual deterioration in performance. In such cases, where the failure criteria must be reached for identification of the design limit, samples are tested to failure to determine their $\tau$ (tau) factors, this being a measure of their lifetime in units of time or cycles.

Another method is an irreversible single stress test, which is directed towards components comprising materials with irreversible time history, such as the high pressure hoses used in the fluid power industry. Such components undergo only one test to determine their $\tau$ factors and are not reused in subsequent ALT tests. The components are exposed to constant stress levels and, depending on the failure mechanism, may be tested below their theoretical design limit for a given time and the incurred damage extrapolated to the DLT or tested to failure.

Yet another test method is a combined stress method, which is directed towards components comprising materials exposed to physical stress, such as a pump rotary group, materials subject to repetitive erosive contact (e.g. self lubricating bearings), and materials subjected to chemical or physical aging (e.g. oxidation or grain growth) causing material degradation, such as winding insulation; can be tested with a combined stress method. This method extrapolates cumulative damage trends to obtain the τ (tau) factors required for calculation of the stress life models.

After developing the stress life model, an ALT stress factor, an ALT failure criteria and key parameters for measurement and continuous monitoring, are extracted to design the accelerated life test protocol. Automated test stands can identify failure trends and consolidate data collected over the course of the accelerated life test.

In another embodiment, the system 100 may be employed to perform a comparative reliability method in order to rank products 102 of the same type by differentiating them from one another. For example, ranking several suppliers of the same equipment is one of many applications for this approach. Alternatively, the products 102 may be differentiated by comparing the stress-life models.

Figure 5:
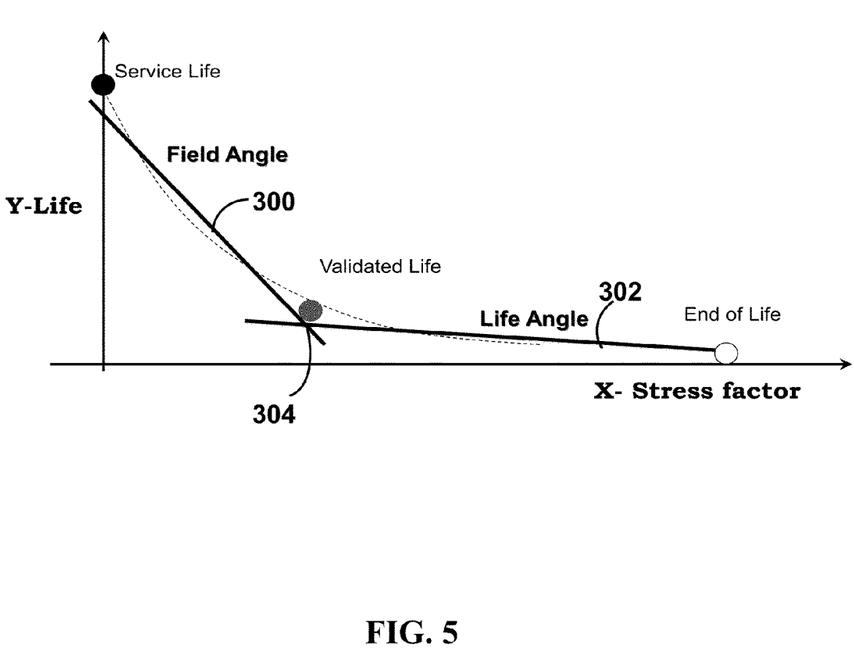
FIG. 5 shows an exemplary stress life model.

FIG. 5 shows a stress life model which is derived from the outcome of reduced life tests that are performed from the end of life of the product 102. A field angle 300 may be predicted and refined using service data from the field, and life angle 302 may also be predicted. The field angle 300 and the life angle 302 intersect at point 304 corresponding to a predicted validated life of the product 102 at the said stress level.

The main purpose of the SLM is to determine the failure mechanisms and multi-stress interactions. SLM consists of the following strategic parameters:

Life Angle: a compounded index for Reliability in the prototyping stage of development, reliability is typically associated with the statistical parameters. The present invention defines the deterministic reliability. It is not sequential or parallel to the product realization process. It is simultaneous and performed by the designers, not a separate team, or even a separate individual. The present invention generates the life angle as a compounded index for deterministic reliability that is measured in the regime of low cycle and high stress with high resolution and low variations.

Life angle=$f$(end of life stress level, time to failure of RLTs, failure mechanisms, measurement error)

Field Angle: a predictive index of the field reliability, field conditions cannot be fully replicated on the test bench and are very costly and time consuming. The present invention predicts the field angle by mathematical models with the accuracy of the measurement error in generating the life angle.

Field angle=$f$(life angle position, life angle measurement error)

Although the description above is directed to deterministic risk reduction methods for product reliability, these methods may be applied to a group of components, a subsystem, a plurality of components within a particular subsystem or a plurality of subsystems.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus.

Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention maybe practiced using one or more servers, as necessary. Thus, the preceding detailed description is presented for purposes of illustration only and not of limitation, and the scope of the invention is defined by the preceding description, and with respect to the attached claims.

What is claimed is:

1. A method to evaluate a service life of a product to be used in a system, wherein said product having a plurality of product-components to achieved a plurality of product-functionalities at a plurality of product-states, and said system having a plurality of system-components and a system-functionality, and wherein said product and said system having a plurality of interface-states, said method comprising the steps of:

a) determining a product design intent based on said system-functionality and how said system controls said product, said product-functionality, said interface-states, and a set of external effects;

b) identifying a set of key performance factors (KPF) of said product and said system that substantially influence the performance of said product and said system;

c) generating a design intent profile (DIP), said profile representing the states of the operation of said product and said system, wherein said DIP being a graphical representation of changes in said interface-states, said product-states and said system-states during the operation;

d) generating a Key Performance Factor Topography (KPFT) for each said KPF, wherein said KPFT represents the response of the system to a set of loading-conditions, and wherein said KPFT is determined by the steps of:

i—identifying a set of mechanisms that support said KPF;

ii—identifying a set of product-sub-components governing said KPF mechanisms;

iii—developing a mathematical model relating said KPF to a set of design parameters of said product-sub-component, said set of loading-conditions and said interface-states;

iv—identifying a set of product-stresses related to said set of loading-conditions;

v—identifying a set of strategic-sub-components supporting the KPFs;

vi—parameterizing a System Model and calculating a theoretical-performance;

vii—testing said product to validate said System Model and said KPFs and to verify the effects of said set of loading-conditions and said product-stresses on said strategic-sub-components; and viii—identifying a set of operating-stress-factors affecting the KPFs using the interface-states;

e) developing a Parameterized Stress Model (PSM) for each of said set of operating-stress-factors, wherein said PSM is generated by modeling a single stress and all of its operating stress factors to find the gap between the stress levels during service life and stress levels close to the End of Life (EOF), wherein the EOF is where product reaches the failure point by applying the cumulative stresses, wherein said PSM is developed by the steps of:
   i—theoretical analysis and testing and plotting the variation of KPFs or a proxy performance based design characteristics (PBDCs) with changes in each of said operating-stress-factors;
   ii—theoretical analysis and testing and plotting the variation of stresses in the strategic-product-component or a proxy load based design characteristics (LBDCs) with changes in each of said operating-stress-factors;
   iii—identifying of the failure level for the KPFs or PBDCs with reference to said design intent;
   iv—identifying a set of failure levels for the product-stresses or the LBDC in the product-component with reference to the material properties of the product;
   v—identifying a set of operating stress levels at which the KPF, the LBDC, the Product-Stress or the LBDC exceed their associated said failure levels, the earliest of which is defined as the End of Life (EOL) for the product-component;
   vi—identifying of a set of normal maximum operating stress factors for the product or the product-component; and
   vii—identifying a set of key stress factors (KSFs) as being those stresses that are under said normal maximum operating stresses and are in close proximity to the end of life stresses;
f) developing a Parameterized Sensitivity Model by testing how changes in the product design parameters affect the end of life, and
g) generating a stress-life model for the product by the steps of:
   i—determining the life of the product as a series of stress levels incrementally less than the EOL stress, wherein the criteria for failure being that defined for PSM development, and
   ii—plotting the life versus stress or the operating stress factor and a best-fit curve to obtain a life-angle for the product.

2. The method of claim 1, wherein said product: state being any one or combination of pressure, temperature, flow rate, fluid contamination level, rotational speed, velocity, vibration level, ambient air temperature, density and humidity, chemistry, voltage, and current.

3. The method of claim 1, wherein said interface-states being any one of input and output parameters of the system.

4. The method of claim 1, wherein said step of developing the Parameterized Stress Model (PSM) for each operating stress factor, comprising the steps of:
a) identifying a set of Operating Stress Factors (OSFs) comprising of parameters acting upon said product and changing the working condition or the product-state;
b) identifying a set of Key Performance Factors (KPF), wherein said KPF being performance characteristics of said product defined in an application as being important to said product fulfilling said product-functionalities, said KPF being functions of one or plurality of said OSFs;
c) selecting one OSF and generating a graph in terms of the selected OSF showing variations of said KPF as a function of the selected OSF, wherein in said graph other OSFs are kept constant;
d) defining product stresses of mechanical, thermal, chemical or electrical types of stresses that may cause damage to said product when their threshold limits are surpassed;
e) representing in said graph variations of said product-stresses, as a function of said selected OSF, wherein in said graph other OSFs are constant;
f) determining the failure mechanisms and conditions in said graph for said KPF by assigning a threshold value for said KPF;
g) determining the failure mechanisms and conditions in said graph for said product-stresses by assigning threshold values for said product-stresses;
h) determining the End of Life failure mechanisms and conditions in terms of said selected OSF as the conditions at which said KPF and said product-stresses meet their failure mechanisms and conditions;
i) determining the Maximum Operating Stress Factor in terms of said selected OSF, being decided by a design engineer in relation to the application and the characteristics of said product, wherein said Maximum Operating Stress Factor being lower than said End of Life conditions of said KPF;
j) determining a risk design associated with said product based on the proximity of said End of Life failure mechanisms and conditions of said product-stresses to said Maximum Operating Stress Factor;
k) extracting the Key Stress Factors from a multiplicity of said product-stresses based on the proximity of their End of Life failure mechanisms and conditions to the Maximum Operating Stress Factor; and
l) going back to step (iii) and repeating the procedure for another OSF.

5. The Parameterized Stress Model of claim 4, wherein said product comprising of mechanical, electrical, chemical, or any other type of devices having inflow and outflow of mass, momentum, and energy.

6. The Parameterized Stress Model of claim 4, wherein said KPF can be substituted by the Performance Based Design Characteristics in cases where said KPF cannot be calculated or measured, and wherein the physical relationships between the KPF and the Performance Based Design characteristic are known.

7. The Parameterized Stress Model of claim 4, wherein said product-stresses can be substituted by the Load Based Design Characteristics in cases where said product-stresses cannot be calculated or measured, and wherein the physical relationships between said product-stresses and said LBDC are known.

* * * * *